US009553485B2

(12) United States Patent
Singh et al.

(10) Patent No.: US 9,553,485 B2
(45) Date of Patent: Jan. 24, 2017

(54) APPARATUS, SYSTEM, AND METHOD FOR DETECTING A FOREIGN OBJECT IN AN INDUCTIVE WIRELESS POWER TRANSFER SYSTEM BASED ON INPUT POWER

(75) Inventors: Manjit Singh, Fremont, CA (US); Siamak Bastami, Gilroy, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 825 days.

(21) Appl. No.: 13/436,309

(22) Filed: Mar. 30, 2012

(65) Prior Publication Data
US 2013/0257168 A1 Oct. 3, 2013

(51) Int. Cl.
  H01F 38/00 (2006.01)
  H02J 17/00 (2006.01)
  H01F 38/14 (2006.01)
  H02J 5/00 (2016.01)

(52) U.S. Cl.
  CPC ............... *H02J 17/00* (2013.01); *H01F 38/14* (2013.01); *H02J 5/005* (2013.01); *Y02E 60/12* (2013.01)

(58) Field of Classification Search
  CPC ............ H01F 38/14; H02J 17/00; H02J 5/005; Y02E 60/12
  USPC .......................................... 307/104; 320/107
  See application file for complete search history.

(56) References Cited

U.S. PATENT DOCUMENTS

| 7,310,245 B2 * | 12/2007 | Ohbo | 363/21.02 |
| 2006/0049903 A1 | 3/2006 | Wolfgram | |
| 2007/0228833 A1 * | 10/2007 | Stevens et al. | 307/45 |
| 2009/0026844 A1 * | 1/2009 | Iisaka et al. | 307/104 |
| 2009/0224723 A1 | 9/2009 | Tanabe | |
| 2009/0322158 A1 * | 12/2009 | Stevens | H02J 5/005 307/104 |
| 2009/0322280 A1 | 12/2009 | Kamijo et al. | |
| 2010/0007307 A1 * | 1/2010 | Baarman et al. | 320/108 |

(Continued)

FOREIGN PATENT DOCUMENTS

| GB | 2414121 A | 11/2005 |
| JP | 201183094 A | 4/2011 |
| WO | 2009081115 A1 | 7/2009 |

OTHER PUBLICATIONS

Sakioto, et al. "Theoretical and empirical comparison of coupling coefficient and refractive index estimation for coupled waveguide fiber", Journal of applied science & engineering technology 2008, <<http://library.rit.edu/oajournals/index.php/%EE%80%80jaset%EE%80%81/article/viewFile/127/133>>.

Primary Examiner — Jared Fureman
Assistant Examiner — Alfonso Perez Borroto
(74) Attorney, Agent, or Firm — Haynes and Boone LLP

(57) ABSTRACT

An inductive wireless power transfer system comprises a transmitter configured to generate an electromagnetic field to a coupling region for providing energy transfer to a wireless power receiving apparatus. The transmitter includes control logic configured to determine a power component of the transmitter, and determine a presence of a foreign object within the coupling region in response to a comparison of the power component and a desired threshold for the power component. Related inductive methods for detecting a foreign object in an inductive wireless power transfer coupling region of an inductive wireless power transfer system and operating a sleep mode of a wireless power transmitter are disclosed.

25 Claims, 4 Drawing Sheets

(56) References Cited

U.S. PATENT DOCUMENTS

| | | | |
|---|---|---|---|
| 2010/0013321 A1* | 1/2010 | Onishi | G08C 17/04 307/104 |
| 2010/0026236 A1* | 2/2010 | Kamiyama | H02J 7/025 320/108 |
| 2010/0084918 A1* | 4/2010 | Fells | H02J 5/005 307/32 |
| 2010/0123430 A1 | 5/2010 | Kojima et al. | |
| 2010/0225173 A1* | 9/2010 | Aoyama | H02M 3/337 307/104 |
| 2011/0127845 A1* | 6/2011 | Walley | H02J 5/005 307/104 |
| 2011/0181473 A1* | 7/2011 | Sulkowski et al. | 342/445 |
| 2011/0196544 A1* | 8/2011 | Baarman et al. | 700/291 |
| 2012/0001493 A1 | 1/2012 | Kudo et al. | |
| 2012/0146576 A1 | 6/2012 | Partovi | |
| 2012/0149301 A1 | 6/2012 | Wiley | |
| 2012/0153740 A1* | 6/2012 | Soar | 307/104 |
| 2013/0026981 A1* | 1/2013 | Van Der Lee | 320/108 |
| 2013/0094598 A1* | 4/2013 | Bastami | 375/259 |
| 2013/0154554 A1 | 6/2013 | Sakai et al. | |

* cited by examiner

APPARATUS, SYSTEM, AND METHOD FOR DETECTING A FOREIGN OBJECT IN AN INDUCTIVE WIRELESS POWER TRANSFER SYSTEM BASED ON INPUT POWER

CROSS-REFERENCE TO RELATED APPLICATIONS

This application is related to copending U.S. patent application Ser. No. 13/272,774, filed Oct. 13, 2011, entitled "Apparatus, System, and Method for Detecting a Foreign Object in an Inductive Wireless Power Transfer System." This application is also related to copending U.S. patent application Ser. No. 13/435,996, filed Mar. 30, 2012, entitled "Apparatus, System, and Method for Detecting a Foreign Object in an Inductive Wireless Power Transfer System via Coupling Coefficient Measurement."

FIELD

Embodiments of the present disclosure relate generally to inductive wireless power transfer and, more particularly, to apparatuses, systems, and methods related to detecting a foreign object that is present during inductive wireless power transfer.

BACKGROUND

Battery-powered devices (e.g., consumer electronic devices, electric and hybrid automobiles, etc.) are often charged from a power source (e.g., AC power outlet) through a charging device. The charging device couples the battery to the power source through an adaptor. The cord extending between the power source and the battery-powered device can take up space. In situations where multiple battery-powered devices require charging, each with their own charger and cord, the charging area can become cramped and inconvenient.

Approaches are being developed that use over-the-air (i.e., wireless) power transmission between a transmitter and a receiver coupled to the electronic device. Wireless power transmission using an inductive coil is one method considered as an untethered method for transferring power wirelessly through a coupled electromagnetic field. In inductive wireless power transmission, power is transferred by transmitting an electromagnetic field through a transmit coil. On the receiver side, a receiver coil may couple with the transmit coil through the electromagnetic field, thus, receiving the transmitted power wirelessly.

A foreign object (e.g., metallic object) may be positioned within the near-field zone, such as between the transmitter and the receiver. As wireless power charging becomes ubiquitous and mainstream, the efficiency as well as safety aspects of wireless power transfer in the presence of foreign objects may be a concern for the end user original equipment manufacturers (OEMs).

BRIEF SUMMARY

Embodiments of the present disclosure include an inductive wireless power transfer device. The inductive wireless power transfer device comprises a transmitter configured to generate an electromagnetic field to a coupling region for providing energy transfer to a wireless power receiving apparatus. The transmitter includes control logic configured to determine a power component of the transmitter, and determine a presence of a foreign object within the coupling region in response to a comparison of the power component and a desired threshold for the power component.

Another embodiment includes a method for detecting a foreign object in a coupling region of an inductive wireless power transfer device. The method comprises determining a power component drawn by a wireless power transmitter, and determining a presence of a foreign object within a coupling region of the wireless power transmitter based on the determined power component.

Another embodiment includes a method of operating a sleep mode of a wireless power transmitter. The method comprises monitoring a power component of a ping of a wireless power transmitter during a sleep mode of the wireless power transmitter, comparing the power component with a desired threshold for the power component, and determining a presence of a foreign object in a coupling region of the wireless power transmitter if the power component of the ping exceeds the desired threshold for the power component.

DETAILED DESCRIPTION

Figure 1A:
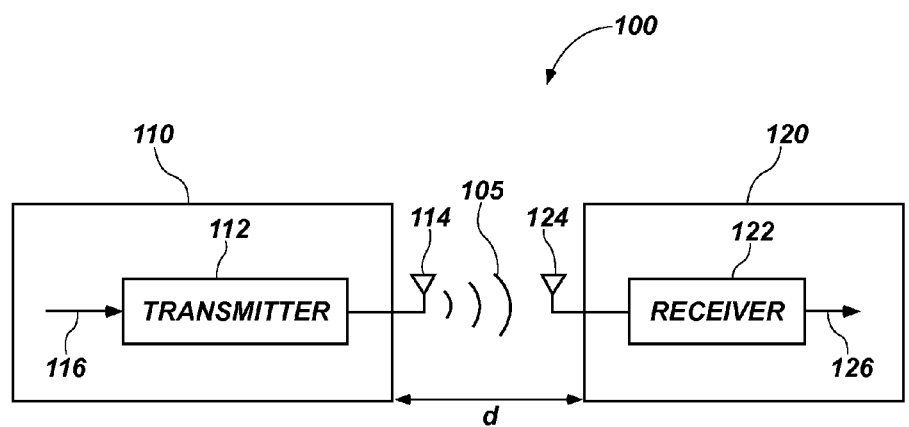
FIG. 1A is a schematic block diagram of an inductive wireless power transfer system.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

FIG. 1A is a schematic block diagram of an inductive wireless power transfer system 100. The inductive wireless power transfer system 100 includes a wireless power transmitting apparatus 110, and a wireless power receiving apparatus 120. The wireless power transmitting apparatus 110 includes a transmitter 112 having a transmit coil 114 configured to generate an electromagnetic field 105 for providing energy transfer to the wireless power receiving apparatus 120. The wireless power receiving apparatus 120 includes a receiver 122 having a receive coil 124 configured to couple with the electromagnetic field 105. The transmit coil 114 and the receive coil 124 may be sized according to the particular devices and applications to be associated therewith. The electromagnetic field 105 may also be referred to as the wireless power signal 105 for energy transfer from the transmitter 112 to the receiver 122.

An input signal 116 is provided to the transmitter 112 for providing the transmitter 112 with the power for generating the electromagnetic field 105 that provides an energy transfer to the wireless power receiving apparatus 120. The receiver 122 couples to the electromagnetic field 105 and generates an output signal 126 in response thereto. The output signal 126 may provide the power that is used by the wireless power receiving apparatus 120 for storing (e.g., charging a battery), consumption (e.g., providing system power), or both.

The transmitter 112 and the receiver 122 are separated by a distance (d). In some embodiments, the transmitter 112 and the receiver 122 may be configured according to a mutual inductance relationship, such that when the resonant frequency of the receiver 122 and the resonant frequency of the transmitter 112 are substantially identical, transmission losses between the transmitter 112 and the receiver 122 are minimal. Likewise, the frequency of the wireless power signal 105 may be set by the transmitter 112 at or neat the resonant frequencies of the coils 114, 124. As a result, an efficient energy transfer occurs by coupling a large portion of the energy in the near-field of the transmit coil 114 to the receive coil 124 rather than propagating most of the energy in an electromagnetic wave to the far-field. If the wireless power receiving apparatus 120 is in the near-field, a coupling mode may be developed between the transmit coil 114 and the receive coil 124. The area around the transmit coil 114 and receive coil 124 where this near-field coupling may occur may be referred to as a coupling region.

The desired distance (d) separating the transmitter 112 and the receiver 122 may be a standard distance (e.g., 2 mm) that is determined by the Wireless Power Consortium (WPC). In some embodiments, the transmit coil 114 and the receive coil 124 may include magnetically attractive elements that assist in ensuring that the transmitter 112 and the receiver 122 remain at a known fixed distance (e.g., 2 mm) during wireless power transfer. In other words, employing a magnetically-guided topology that aligns the transmitter 112 and the receiver 122 may ensure that the transmitter 112 and the receiver 122 align within a relatively tight fixed vertical distance. For example, the transmitter 112 may include a magnet, while the receiver 122 may include an attractor (or vice versa).

The transmit coil 114 and the receive coil 124 may be considered like antennas that may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power transmitting apparatus 110 may be a wireless power charger. The wireless power receiving apparatus 120 may be a mobile electronic device, such as a cell phone, smart phone, media player (e.g., mp3 player), electronic reader, tablet, personal digital assistant (PDA), camera, lap top computer, and personal electronic device in which wireless power may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110. In some embodiments, the wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation.

Figure 1B:
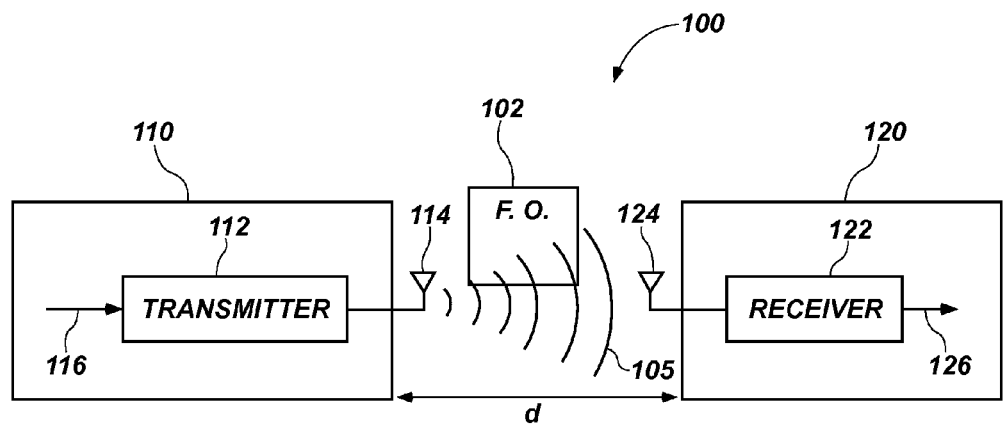
FIG. 1B is the inductive wireless power transfer system having a foreign object present within the electromagnetic field.

As shown in FIG. 1B, the inductive wireless power transfer system 100 may have a foreign object (F.O.) 102 present within the coupling region of the electromagnetic field 105. Of course, there may be more than one foreign object 102 present. The presence of the foreign object 102 may cause problems for the inductive wireless power transfer system 100. For example, if the foreign object 102 has a sufficiently strong metallization, the foreign object 102 may receive at least some of the energy (e.g., generate eddy currents) during wireless power transfer from the transmitter 112 to the receiver 122. As a result, the foreign object 102 may steal at least a portion of the energy of the electromagnetic field 105 that is intended for the wireless power receiving apparatus 120. The foreign object 102 may reduce the energy that the wireless power receiving apparatus 120 receives, which may result in a reduced level of wireless power transfer. In addition, if the foreign object 102 is physically between the transmitter 112 and the receiver 122, the wireless power transfer may be reduced due to the increased vertical distance between the transmitter 112 and the receiver 122.

In addition, the foreign object 102 may convert the received energy to heat. The heat generated by the foreign object 102 may cause problems such as melting materials that are part of or near the foreign object 102, and may further create fire and other hazardous conditions to the inductive wireless power transfer system 100 as well as to the end user (e.g., burn potential if contacted by the end user). For example, it has been observed that for a 5 W power delivered to the receiver 122, a metal object as small as quarter coin may absorb enough power in the metal object to induce temperature as high as 80° C.

Embodiments of the present disclosure include the inductive wireless power transfer system 100 being configured to detect the presence of the foreign object 102 within the coupling region of the inductive wireless power transfer system 100. In other words, the inductive wireless power transfer system 100 may be configured to detect the foreign object 102 located within the coupling region of the electromagnetic field 105 between the transmitter 112 and the receiver 122.

In response to detecting the foreign object 102, the inductive wireless power transfer system 100 may reduce or disable generation of the electromagnetic field 105. For example, the inductive wireless power transfer system 100 may disable the transmitter 112. In some embodiments, the inductive wireless power transfer system 100 may reduce the transmitting power of the transmitter 112 to reduce the potential for a hazardous condition of the foreign object 102 without completely stopping the charging of the wireless power receiving apparatus 120. The inductive wireless power transfer system 100 may also notify the user of the presence of the foreign object 102 for the user to take the appropriate remedial measures to remove the foreign object 102.

Embodiments of the present disclosure may include the inductive wireless power transfer system 100 to determine (e.g., measure, estimate, etc.) an input power component of the transmitter 112, and to determine a presence of a foreign object 102 within the coupling region in response to a comparison of the input power component and a desired threshold for the input power component.

Figure 2:
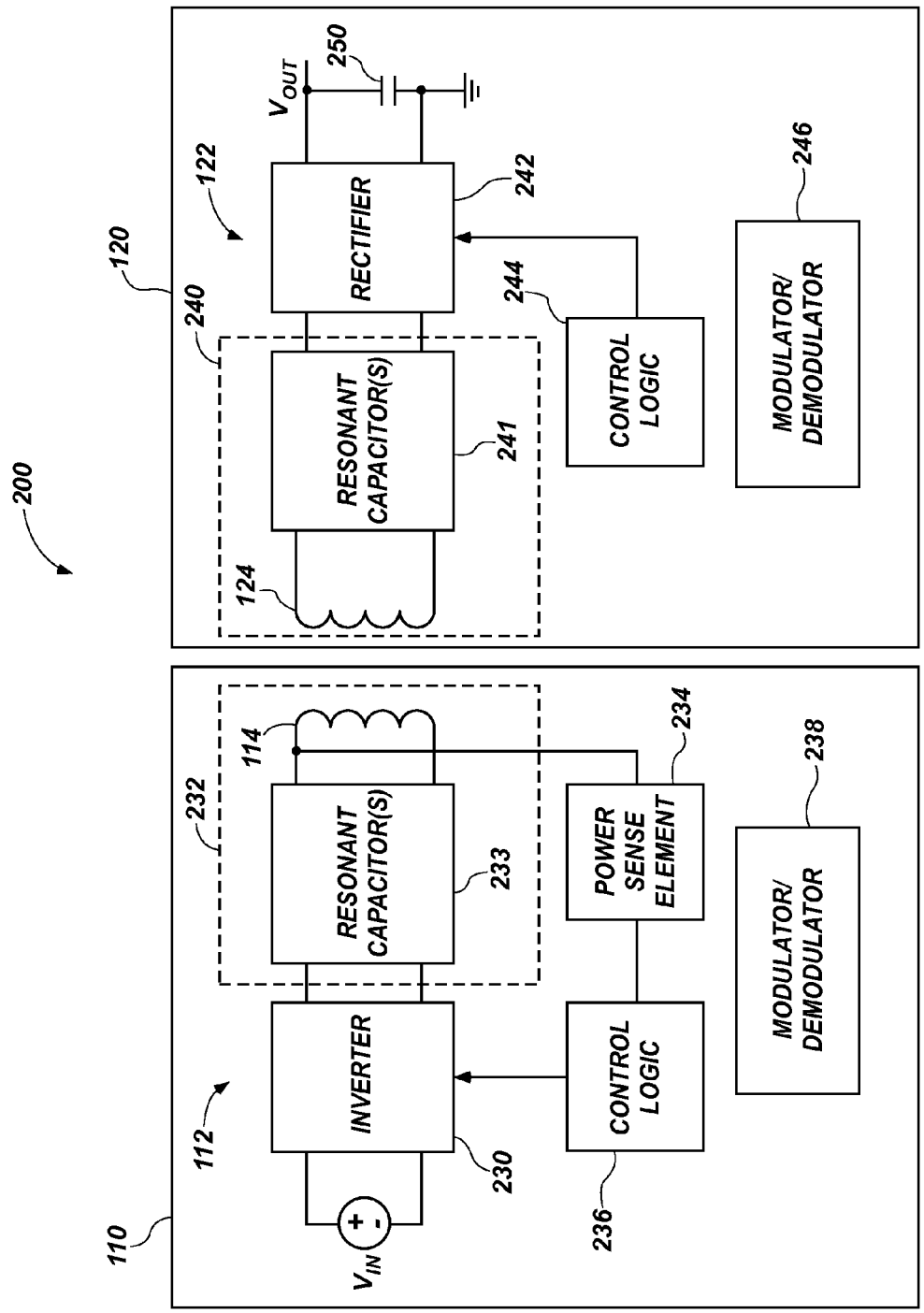
FIG. 2 is a schematic block diagram of a wireless power transfer system according to an embodiment of the present disclosure.

FIG. 2 is a schematic block diagram of a wireless power transfer system 200 according to an embodiment of the present disclosure. The wireless power transfer system 200 includes a wireless power transmitting apparatus 110 and a wireless power receiving apparatus 120 as previously discussed above with respect to FIGS. 1A and 1B. The wireless power transmitting apparatus 110 may be a wireless power charger. The wireless power receiving apparatus 120 may be any device that may operate with electric power. The wireless power receiving apparatus 120 may use the received wireless power for system power, for charging an energy storage unit (e.g., battery), or both.

In some embodiments, the wireless power transmitting apparatus 110 may be also be configured to receive wireless power. In addition, some embodiments may include a wireless power receiving apparatus 120 that may also be configured to transmit wireless power. In other words, embodiments of the present disclosure may include an apparatus that includes the components described herein as being part of either wireless power transmitting apparatus 110 or the wireless power receiving apparatus 120 and may operate in either a transmit mode or a receive mode.

The wireless power transmitting apparatus 110 includes a transmitter 112 including a transmit coil 114 configured to generate an electromagnetic field 105 (FIGS. 1A and 1B) for providing energy transfer to the wireless power receiving apparatus 120. The wireless power receiving apparatus 120 includes a receiver 122 including a receive coil 124 configured to receive the electromagnetic field 105 for inductive coupling with the transmit coil 114.

The transmitter 112 may further include an inverter 230, a resonant tank 232, a power sense element 234, control logic 236, and modulator/demodulator 238. The resonant tank 232 may include one or more capacitors (e.g., resonant capacitor(s) 233) coupled with an inductor (e.g., the transmit coil 114). The inverter 230 is coupled between the input voltage ($V_{IN}$) and the resonant tank 232. The power sense element 234 may be coupled with the resonant tank 232. The control logic 336 may be coupled with the power sense element 234, the inverter 230, and the modulator/demodulator 238.

The receiver 122 may further include a resonant tank 240, a rectifier 242, control logic 244, and a modulator/demodulator 246. The resonant tank 240 may include an inductor (e.g., receive coil 124) coupled with one or more capacitor (e.g., resonant capacitor(s) 241). The resonant tank 240 is coupled with the rectifier 242. The control logic 244 may be coupled with the rectifier 242 and the modulator/demodulator 246.

In operation of the transmitter 112, the inverter 230 and the resonant tank 232 convert the input signal ($V_{IN}$) (a DC signal) to an AC signal that can be used to transmit the electromagnetic field 105 (FIG. 1A) to the receiver 122. As current flows through the transmit coil 114, the electromagnetic field 105 is generated. The resonant tank 232 of the transmitter 112 may have a resonant frequency that may be tuned based on the inductance of the transmit coil 114 and the capacitance of the plates and configuration of the resonant capacitor(s) 233. The power sense element 234 may be configured to measure (e.g., sense) power components of the transmitter 112 and send the measured power components to the control logic 236. For example, the power sense element 234 may measure the voltage across the transmit coil 114 (i.e., $V_{COIL}$), and measure the current flowing through the transmit coil 114 (i.e., $I_{COIL}$). In another embodiment, the power sense element 234 may measure the input voltage of the transmitter 112 (i.e., $V_{IN}$) and the input current of the transmitter (i.e., $I_{IN}$), or other combinations of voltage and current measurements. Thus, depending on the particular configuration of the power sense element 234, the power sense element 234 may measure power components of AC power (e.g., $V_{COIL}*I_{COIL}$) or DC power (e.g., $V_{IN}*I_{IN}$).

Therefore, even though the power sense element 234 is shown in FIG. 2 as being coupled to measure the AC power components at the transmit coil 114, the power sense element 234 may be coupled within the transmitter 112 at various locations. For example, the power sense element 234 may be coupled to a node between the inverter 230 and the resonant tank 232. Another location that the power sense element 234 may be coupled is between the input voltage ($V_{IN}$) source and the inverter 230. These various locations are not explicitly shown in FIG. 2 so as to not obscure the figure with additional lines. It is contemplated, however, that embodiments of the present disclosure may include the power sense element 234 coupled at multiple different locations within the same transmitter 112 or, in some embodiments, at only one of these locations. As a result, the power sense element 234 may sense different types of power measurements, including average power, RMS power, input power, DC power, AC power, output power of the transmit coil 114, and other combinations of voltage and current measurements of the transmitter 112.

In operation of the receiver 122, the electromagnetic field 105 is received by the receiver 122 and current is generated and flows through the receive coil 124. In other words, the transmit coil 114 and the receive coil 124 may be inductively coupled. Thus, the wireless power transfer system 200 may also be referred to as an inductive wireless power transfer system. The resonant frequency of the resonant tank 240 may be based on the inductance of the receive coil 124 and the capacitance of the plates of the resonant capacitor(s) 241. If the resonant frequencies of the resonant tanks 232, 240 are substantially the same, the coupling efficiency and wireless power transfer may be improved. During wireless power transfer between the transmitter 112 and the receiver 122, inductive coupling may be established therebetween. The resonant tank 240 generates the current (an AC signal) from coupling with the electromagnetic field 105, and the rectifier 242 converts that AC signal to the output signal $V_{OUT}$ (a DC signal). The output signal $V_{OUT}$ may be output to a load. The output signal $V_{OUT}$ may be filtered by a filter capacitor 250 and output to the load through voltage regulator (not shown). The filter capacitor 250 and the voltage regulator may be used in some embodiments to further smooth the DC signal and set it to an appropriate DC voltage as a power output for use by the load. The load may be system components of an electronic device such that the output signal $V_{OUT}$ is used to provide system power the electronic device. The load may also be an energy storage device (e.g., battery) such that the output signal $V_{OUT}$ is used to provide the charging power for the energy storage device. Some embodiments may utilize the output signal $V_{OUT}$ to provide both system power and charging power simultaneously.

Embodiments of the disclosure include the transmitter 112 of the wireless power transfer system 200 detecting the presence of a foreign object 102 (FIG. 1B) based on the input power of the transmitter 112. For example, the transmitter 112 may determine an input power component for comparison with a desired threshold for the input power component. Such a determination may be performed on the transmitter 112 side only without communication from the wireless power receiving apparatus 120. For example, in some situations, a foreign object 102 may be present to interact with the electromagnetic field 105 from the transmitter 112 while the wireless power receiving apparatus 120 is not present in the coupling region of the transmitter 112. In other situations, the foreign object 102 may be present to interact with the electromagnetic field 105 from the transmitter 112, while the wireless power receiving apparatus 120 is present in the coupling region, but communication between the transmitter 112 and the receiver 122 may be blocked or substantially attenuated by the foreign object 102. Some foreign object detection methods may be a system-based solution that requires the presence of both the transmitter 112 and the receiver 122; however, at least for these reasons, it may be desirable for foreign object detection to be performed by the transmitter 112 regardless of the presence of the receiver 122 in the coupling region.

In some embodiments, when the transmitter 112 is not involved in wireless power transfer to the receiver 122, the transmitter 112 may scan the environment to detect the receiver 122. For example, the transmitter 112 may be in a "sleep mode," such as when the receiver 122 is not present in the coupling region. During a sleep mode the generation of the electromagnetic field 105 may be reduced. For example, the transmitter 112 may scan the environment by generating the electromagnetic field 105 for only a brief period of time. This brief generation of the electromagnetic field 105 may be referred to as a "ping." The transmitter 112 may "wake up" briefly and ping the environment periodically to determine if the receiver 122 is present. For the time between successive pings, the transmitter 112 may be "asleep," in that the electromagnetic field 105 is not generated.

The transmitter 112 may ping the environment and wait for a response from the receiver 122. An example of a response from the receiver 122 may be that the receiver 122 sends a data packet to the transmitter 112. Such a data packet may include an initiation command that begins an initiation procedure through which the transmitter 112 and the receiver 122 talk to each other. Such communication may be transmitted and understood through the modulators/demodulators 238, 246.

If the transmitter 112 receives no response from the receiver 122, the transmitter 112 may determine that the receiver 122 is not present within the coupling region. In response, the transmitter 112 may remain in the sleep mode and continue pinging the environment at the desired intervals. If the transmitter 112 receives a response from the receiver 122, the transmitter 112 may determine that the receiver 122 is present within the coupling region. In response, the transmitter 112 may enter an "active mode" and initiate continuous wireless power transfer (i.e., through inductive coupling) with the receiver 122.

As discussed above, a foreign object 102 (FIG. 1B) may be present within the coupling region (e.g., between the transmitter 112 and receiver 122, nearby, etc.) of the transmitter 112. The foreign object 102 may be a metal object, such as a coin, paper clip, etc. In some situations, the receiver 122 may be present in the intended coupling region, but the presence of the foreign object 102 may block the ping from being received by the receiver 122 and/or block the response from the receiver 122 from being received by the transmitter 112. In such situations, the transmitter 112 may remain in the sleep mode because no return data was received by the transmitter 112. As a result, continuous wireless power transfer may not be initiated as desired when the receiver 122 is present to receive wireless power. Even during continuous wireless power transfer, the presence of a foreign object 102 within the coupling region may cause the wireless power transfer to be less efficient.

In addition, the foreign object 102 itself may draw enough power to possess a temperature that is hazardous. For example, if the foreign object 102 (e.g., metal object, coin, etc.) has enough mass, eddy currents may be generated that may generate heat in the foreign object 102. As discussed above, the heat generated by the foreign object 102 may cause problems such as melting materials that are part of or near the foreign object 102, and may further create fire and other hazardous conditions to the inductive wireless power transfer system 100 as well as to the end user (e.g., burn potential if contacted by the end user). The heat may be generated from continuous wireless power transfer to the receiver 122, but may also generated from pings from the transmitter 112. Some foreign objects 102, however, may be small enough to not cause significant problems. As described below, a plurality of thresholds may be used to distinguish between situations where the foreign object 102 may or may not cause a significant problem.

When the foreign object 102 is present within the coupling region, eddy currents may be generated within the foreign object 102. The existence of these eddy currents in the coupling region may translate into an increase in input power of the transmitter 112 by some amount. The transmitter 112 may be configured to monitor the power components of the transmit coil 114 for comparison with a desired threshold for the power components. Power components may include the power dissipated, the voltage across the transmit coil 114, and the current flowing through the transmit coil 114. For example, the current measured may include the peak current, average current, etc. The power may include average power, RMS power, etc. The transmitter 112 may monitor the power components of the transmit coil 114 through the power sense element 234, which sends the power components to the control logic 236 for further processing (e.g., calculations, comparison to thresholds, and other analysis of the data).

If the measured power component (e.g., input power) is above the desired threshold, the transmitter 112 may determine that the foreign object 102 is present. The increased power draw may be based on the size, geometry, and composition of the foreign object 102. For example, the presence of a dime coin might cause the transmit coil 114 to draw 30% to 40% more power than if the dime coin were not in the coupling region. The desired threshold may be a predetermined threshold that is based on the expected power component if there is no foreign object 102 present in the coupling region. The desired threshold may be set to some amount above the expected power component value in order to account for some margin for error, or to account for some situations in which the presence of a foreign object does not cause a hazardous or otherwise problematic situation. For example, the predetermined threshold may be based on a percentage above the expected power component. In another embodiment, the predetermined threshold may be set to be a specific predetermined value. In another embodiment, the predetermined threshold may be set to be a value representing the difference of the expected power component value and the measured power component value. In some embodiments, the desired threshold may be dynamically adjusted based on the operating conditions of the transmitter 112. For example, the input power may be monitored over time (e.g., during sleep mode) and the average power component value may be determined over time. This average power component value may be used to determine the desired threshold. Over time, the average power component value may be adjusted depending on other environmental factors that may influence power dissipation. In other words, if there is no foreign object 102 present within the coupling region of the transmitter 112, the average power component (e.g., input current) will be the same as what is stored as an average power component value (e.g., average input current).

The transmitter 112 may use a plurality of thresholds in the determination of the presence of the foreign object 102. For example, a first threshold may be a threshold set for a power component value that does not necessarily indicate a significant problem. For example, the foreign object 102 may be a relatively small object (e.g., have a relatively small amount of metal) such that the potential hazard is minimal. The first threshold may also be referred to as a "level 1" warning. A second threshold may be a threshold set for a power component level that may pose a greater problem than the first threshold level. The second threshold may also be referred to as a "level 2" warning. The threshold levels may be defined as ranges of power component values. As an example, the first threshold may be set to be a level that is 50% above the expected power component value, while the second threshold may be set to be a level that is 100% above the expected power component value. For example, a level 1 warning may be determined if the determined power component is between 50% and 100% of the expected power component value, while a level 2 warning may be determined for determined power component values above 100%. Additional threshold levels may be set for power component values that indicate different levels of problems or other potential hazards.

The different threshold levels may also be associated with different remedial actions for the transmitter 112 to take. Examples of such remedial actions may include notifying a user of the presence of the foreign object 102, modifying the power of the electromagnetic field 105 generated by the transmitter 112, modifying the rate of pinging during sleep mode, and combinations thereof. In some embodiments, the potential for hazard may be so great that the transmitter 112 may be disabled for wireless power transfer as well as pinging until the foreign object 102 is removed and the transmitter 112 is reset. For example, the user may be prompted (e.g., through alarm, message, etc.) to remove the foreign object 102 and reset the wireless power transmitting apparatus 110.

As a result, using a plurality of thresholds permits different warnings indicating varying degree of severity. A level 1 warning may indicate a small object is detected that may draw small amount of power that may merely render the system inefficient, but may not cause a hazardous situation. Thus, it may be safe for the transmitter 112 to proceed to power transfer mode, operate at a reduced power mode, operate in a sleep mode at a slower ping rate, etc. A level 2 warning may indicate a relatively large object is detected above system tolerances and that it may not safe for the transmitter 112 to proceed to power transfer phase, or that the sleep mode may be have to operate at a substantially reduced ping rate.

Implementation of these features may be internal to an IC chip for the transmitter 112. For example, the power components may be measured internally along with the determination of the presence of the foreign object 102 presence, which may be performed internally by an on-board microcontroller (or other processor). The predetermined threshold may be programmed and stored in memory (e.g., non-volatile memory, such as a one-time programmable (OTP) cell, multiple-time programmable (MTP) cell, etc.). One or more thresholds may be stored as a look-up table that may be used for different operational modes of the transmitter 112.

Figure 3:
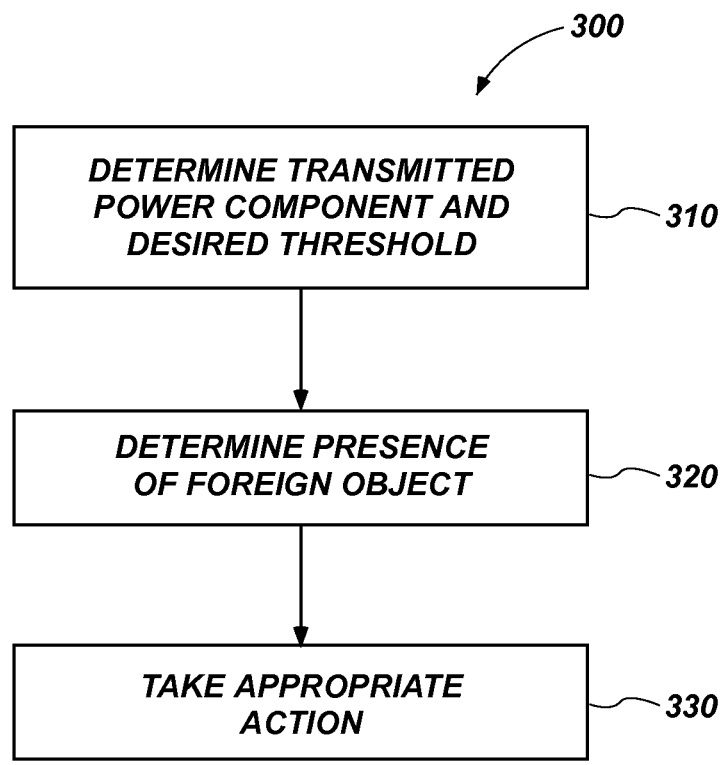
FIG. 3 is a flow chart illustrating a method for detecting a foreign object in a coupling region of an inductive wireless power transfer device according to an embodiment of the present disclosure.

FIG. 3 is a flow chart 300 illustrating a method for detecting a foreign object in a coupling region of an inductive wireless power transfer device according to an embodiment of the present disclosure. At operation 310, a power component drawn by a wireless power transmitter and a desired threshold may be determined. The power component may be one of a voltage, current, and power related to a transmit coil of the transmitter during wireless power generation. The desired threshold may be a predetermined threshold above an expected power component when no wireless power devices are present in the coupling region. The desired threshold may be based on a percentage of the expected power component, or some difference value. The expected power component value and desired threshold may be predetermined and stored in memory for access by the control logic during the determination, while in some embodiments these values may be updated as average current and power values may be calculated.

Determining the power component may occur when a wireless power receiver is determined to not be present in the coupling region. In other words, the determination may be independent of the presence of the wireless power receiver. For example, the wireless power receiver may not be present, or in some cases, may be present, but may not be able to communicate with the power component to identify its presence. The wireless power transmitter may determine whether the wireless power receiver is present in the coupling region by generating a ping to an environment and waiting for a response from the wireless power receiver, such as during a sleep mode. Determining the power component may include sensing the power component of a transmit coil during the ping.

At operation 320, the presence of the foreign object may be determined. For example, determining the presence of the foreign object may include comparing the determined power component with the desired threshold. In some embodiments a plurality of thresholds may be used. At operation 330, an action may be taken in response to the determination of the presence of the foreign object. For example, a message or other notification may be provided to a user informing the user of the presence of the foreign object, which may prompt the user to remove the foreign object. Another action may include reducing the power of the generated electromagnetic field. Another action may include reducing a pinging frequency of the wireless power transmitter during a sleep mode of the wireless power transmitter.

Figure 4:
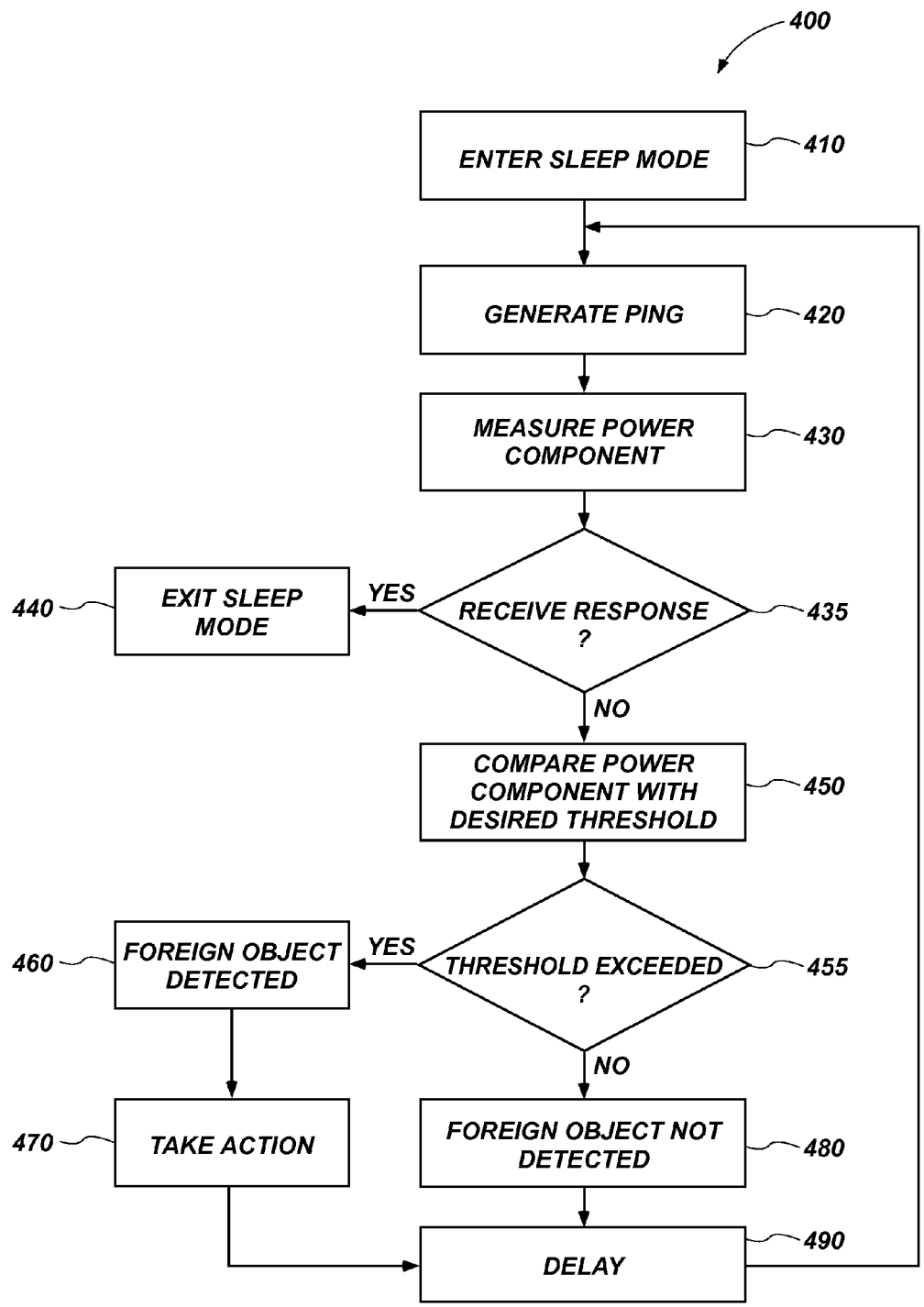
FIG. 4 is a flow chart illustrating a method of operating a sleep mode of a wireless power transmitter according to an embodiment of the present disclosure.

FIG. 4 is a flow chart 400 illustrating a method of operating a sleep mode of a wireless power transmitter according to an embodiment of the present disclosure. At operation 410, the sleep mode may be entered. At operation 420, the wireless power transmitter may ping the environment. A ping may be a brief pulse of the electromagnetic field generated by the wireless power transmitter. The ping may have a lower power than a continuous electromagnetic field for wireless power transfer. At operation 430, a power component of the wireless power transmitter may be measured from the ping. For example, a power sense element may sense the power, current, and/or voltage of the transmit coil of the transmitter.

At operation 435, it may be determined if the wireless power transmitter receives a response from a wireless power receiver within the coupling region. The wireless power transmitter may wait an amount of time in order for the response (e.g., initiation signal, confirmation signal, etc.) to be sent and received. If the response is received, at operation 440 the sleep mode may be exited, and an active mode (e.g., continuous wireless power transfer) may begin. During continuous wireless power transfer, the wireless power transmitter may determine the presence of the foreign object on the transmitter side based on the transmitter power components, which may include using different thresholds than in the sleep mode.

If no response is received from the wireless power receiver, at operation 450, the determined power component may be compared with the desired threshold as discussed above. At operation 455, the comparison occurs to determine if the desired threshold is exceeded. If the desired threshold is exceeded, at operation 460 a foreign object is detected. As discussed above, a plurality of thresholds may be used. At operation 470, an action may be taken in response to the determination of the presence of the foreign object. Examples of such actions include providing a message, notification, etc. informing the user of the presence of the foreign object, which may prompt the user to remove the foreign object. Another action may include reducing the power of the generated electromagnetic field. Yet another action may include reducing a pinging frequency of the wireless power transmitter during a sleep mode of the wireless power transmitter.

If the desired threshold is not exceeded, at operation 480 the foreign object may not be detected. At operation 490, the wireless power transmitter may include some delay prior to generating the next ping. During this time of delay, the wireless power transmitter may be considered "asleep." The amount of delay may depend on the desired pinging frequency, which may be adjusted depending on the determination of the presence of the foreign object.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An inductive wireless power transfer device, comprising:
   a transmitter configured to generate an electromagnetic field to a coupling region for providing energy transfer to a wireless power receiving apparatus, wherein the transmitter includes control logic configured to:
   determine a first input power of the transmitter from a ping generated during a sleep mode;

determine a presence of a foreign object within the coupling region in response to a comparison of the first input power to a first desired threshold;

reduce a frequency of the ping in response to determining the presence of the foreign object; and transmit the ping at the reduced frequency.

2. The inductive wireless power transfer device of claim 1, wherein the first input power is one of a power value and a current value.

3. The inductive wireless power transfer device of claim 1, wherein the sleep mode is a non-continuous wireless power transfer state.

4. The inductive wireless power transfer device of claim 1, wherein the first input power is determined while there are no wireless power receiving devices within the coupling region.

5. The inductive wireless power transfer device of claim 1, wherein the first desired threshold is a value above an expected power value when no foreign object is present in the coupling region.

6. The inductive wireless power transfer device of claim 1, further comprising a wireless power charging device that includes the transmitter and the control logic.

7. The inductive wireless power transfer device of claim 1, further comprising an integrated circuit chip that includes the transmitter and the control logic.

8. The inductive wireless power transfer device of claim 1, wherein the transmitter further includes a power sense element configured to sense the first input power for the transmitter and transmit the first input power to the control logic.

9. The inductive wireless power transfer device of claim 8, wherein the power sense element is coupled to a transmit coil of the transmitter, the power sense element configured to measure a second input power for the transmit coil.

10. The inductive wireless power transfer device of claim 9, wherein the power sense element is coupled to an input power source of the transmitter and is configured to measure a voltage and current of the input power source of the transmitter.

11. The inductive wireless power transfer device of claim 1, wherein the control logic is further configured to:

when the first input power does not exceed the first desired threshold, exit the sleep mode to begin wireless power transfer during an active mode;

compare a second input power to a second desired threshold for the transmitter during the active mode; and in response to the comparison, determine a presence of a foreign object within the coupling region when the second input power exceeds the second desired threshold during the active mode.

12. The inductive wireless power transfer device of claim 11, wherein the control logic is further configured to compare the first input power to a third threshold for the transmitter during the sleep mode and compare the second input power to a fourth threshold for the transmitter during the active mode.

13. The inductive wireless power transfer device of claim 12, wherein the control logic is further configured to:

disable the ping generated until the foreign object has been removed in response to a determination that the first input power exceeds the third threshold for the transmitter during the sleep mode; and disable wireless power transfer until the foreign object has been removed in response to a determination that the second input power exceeds the fourth threshold for the transmitter during the active mode.

14. A method for detecting a foreign object in a coupling region of an inductive wireless power transfer device, the method comprising:

determining a first input power drawn by a wireless power transmitter during a ping generated during a sleep mode;

determining a presence of a foreign object within a coupling region of the wireless power transmitter based on a comparison of the first input power and a first desired threshold; and reducing a frequency of the ping in response to determining the presence of the foreign object; and transmit the ping at the reduced frequency.

15. The method of claim 14, wherein determining the first input power occurs when a wireless power receiver is determined to not be present in the coupling region.

16. The method of claim 14, wherein determining the presence of the foreign object comprises comparing the determined first input power with a plurality of desired thresholds.

17. The method of claim 14, further comprising reducing a pinging frequency of the wireless power transmitter during the sleep mode of the wireless power transmitter.

18. The method of claim 14, further comprising notifying a user in response to the determination of the presence of the foreign object.

19. The method of claim 14, further comprising:

comparing the first input power to a second threshold for the wireless power transmitter during the sleep mode;

when the first input power does not exceed the first desired threshold, exiting the sleep mode to begin wireless power transfer during an active mode;

comparing a second input power to a third desired threshold for the wireless power transmitter during the active mode;

in response to the comparison, determining a presence of a foreign object within the coupling region when the second input power exceeds the third desired threshold during the active mode; and comparing the second input power to a fourth threshold for the wireless power transmitter during the active mode.

20. The method of claim 19, further comprising:

disabling the ping generated until the foreign object has been removed in response to a determination that the first input power exceeds the second threshold for the wireless power transmitter during the sleep mode; and disabling wireless power transfer until the foreign object has been removed in response to a determination that the second input power exceeds the fourth threshold for the wireless power transmitter during the active mode.

21. A method of operating a sleep mode of a wireless power transmitter, the method comprising:

monitoring a first input power of a ping of a wireless power transmitter during a sleep mode;

comparing the first input power to a first desired threshold for the wireless power transmitter;

determining a presence of a foreign object in a coupling region of the wireless power transmitter responsive to the first input power exceeding the first desired threshold for the wireless power transmitter during the sleep mode;

reducing a frequency of the ping in response to determining the presence of the foreign object; and transmit the ping at the reduced frequency.

22. The method of claim 21, further comprising waiting for a response period to receive a response from a wireless power receiver prior to determining the presence of the foreign object.

23. The method of claim 22, further comprising exiting the sleep mode responsive to receiving the response from the wireless power receiver during the response period.

24. The method of claim 21, further comprising adjusting time intervals between subsequent pings in response to determining the presence of a foreign object in the coupling region.

25. The method of claim 21, wherein monitoring the first input power occurs independently of a determination that a wireless power receiver is present in the coupling region.

* * * * *